United States Patent
Tsuchiya et al.

(10) Patent No.: US 10,048,866 B2
(45) Date of Patent: Aug. 14, 2018

(54) STORAGE CONTROL APPARATUS AND STORAGE CONTROL METHOD

(71) Applicant: FUJITSU LIMITED, Kawasaki-shi, Kanagawa (JP)

(72) Inventors: Yoshihiro Tsuchiya, Yokohama (JP); Takashi Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 174 days.

(21) Appl. No.: 14/861,153

(22) Filed: Sep. 22, 2015

(65) Prior Publication Data

US 2016/0011788 A1 Jan. 14, 2016

Related U.S. Application Data

(63) Continuation of application No. PCT/JP2014/058353, filed on Mar. 25, 2014.

(30) Foreign Application Priority Data

Mar. 29, 2013 (JP) .................................. 2013-074643

(51) Int. Cl.
  *G06F 3/06* (2006.01)
  *G06F 12/1018* (2016.01)
  *G06F 11/00* (2006.01)

(52) U.S. Cl.
  CPC .......... *G06F 3/0608* (2013.01); *G06F 3/0641* (2013.01); *G06F 3/0673* (2013.01); *G06F 3/0674* (2013.01); *G06F 11/00* (2013.01); *G06F 12/1018* (2013.01); *G06F 2212/65* (2013.01)

(58) Field of Classification Search
  None
  See application file for complete search history.

(56) References Cited

U.S. PATENT DOCUMENTS

| 5,651,138 A * | 7/1997 | Le ...................... G06F 12/1441 711/154 |
| 2002/0073276 A1* | 6/2002 | Howard .............. G06F 11/1004 711/113 |

(Continued)

FOREIGN PATENT DOCUMENTS

| JP | 2011-118712 | 6/2011 |
| JP | 2011-186954 | 9/2011 |

(Continued)

OTHER PUBLICATIONS

International Search Report dated May 27, 2014 in corresponding international application PCT/JP/2014/058353.

(Continued)

*Primary Examiner* — Jared I Rutz
*Assistant Examiner* — Stephanie Wu
(74) *Attorney, Agent, or Firm* — Staas & Halsey LLP

(57) ABSTRACT

A storage control apparatus includes a plurality of MBFs for managing pieces of data stored in a storage by storage region, caches some of the MBFs on a RAM, and determines the presence or absence of redundancy on a basis of the MBFs on the RAM alone. The storage control apparatus performs redundancy elimination on the pieces of data already stored in the storage on the basis of how the MBFs are used such that the contents of a hash log for an MBF higher in frequency of use are maintained.

6 Claims, 10 Drawing Sheets

(56) References Cited

U.S. PATENT DOCUMENTS

| | | | | |
|---|---|---|---|---|
| 2002/0161961 | A1* | 10/2002 | Hardin | G06F 13/24 |
| | | | | 711/6 |
| 2004/0193777 | A1* | 9/2004 | LaBerge | G06F 13/4022 |
| | | | | 711/5 |
| 2006/0277363 | A1* | 12/2006 | Qiu | G06F 11/1076 |
| | | | | 711/114 |
| 2010/0217771 | A1* | 8/2010 | Nash | G06F 17/30873 |
| | | | | 707/769 |
| 2011/0138144 | A1 | 6/2011 | Tamura et al. | |
| 2011/0225182 | A1* | 9/2011 | Tsuchiya | G06F 17/3033 |
| | | | | 707/769 |
| 2011/0307457 | A1 | 12/2011 | Ishii et al. | |
| 2012/0106309 | A1* | 5/2012 | Oishi | G06F 3/0608 |
| | | | | 369/53.44 |
| 2014/0244960 | A1* | 8/2014 | Ise | G06F 3/061 |
| | | | | 711/165 |
| 2014/0281311 | A1* | 9/2014 | Walker | G06F 3/0631 |
| | | | | 711/162 |
| 2014/0351523 | A1* | 11/2014 | Samanta | G06F 3/06 |
| | | | | 711/130 |
| 2015/0046142 | A1* | 2/2015 | Ramamoorthy | G06F 12/0802 |
| | | | | 703/21 |
| 2015/0120997 | A1* | 4/2015 | Mitsubori | G11C 5/025 |
| | | | | 711/105 |
| 2016/0203045 | A1* | 7/2016 | Suzuki | G06F 11/1068 |
| | | | | 714/764 |

FOREIGN PATENT DOCUMENTS

| | | |
|---|---|---|
| JP | 2012-094220 | 5/2012 |
| WO | WO 2010/100733 | 9/2010 |

OTHER PUBLICATIONS

Written Opinion dated May 27, 2014 in corresponding international application PCT/JP/2014/058353.

Tsuchiya et al., "DBLK: Deduplication for Primary Block Storage", Mass Storage Systems and Technologies (MSST), 2011 IEEE 27th Symposium, pp. 1-5.

"2Q: a Low overhead high performance buffer replacement algorithm" T. Johnson and Dennis Shasha, Very Large Database Systems Conference 199.

Office Action, dated Oct. 18, 2016, in Japanese Application No. JP2013-074643 (9 pp.).

* cited by examiner

FIG. 3

| BF1-1 | | | | | | | | | | | | | | | |
|---|---|---|---|---|---|---|---|---|---|---|---|---|---|---|---|
| BF2-1 | | | BF2-2 | | | | BF2-3 | | | | BF2-4 | | | | |
| BF3-1 | BF3-2 | BF3-3 | BF3-4 | BF3-5 | BF3-6 | BF3-7 | BF3-8 | BF3-9 | BF3-10 | BF3-11 | BF3-12 | BF3-13 | BF3-14 | BF3-15 | BF3-16 |

BOTTOM-LAYER BF SPECIFICATION INFORMATION #1 — 25

| HASH VALUE | PBA |
|---|---|
| 204d0f2fbe9dba86df8c6c01381c959edd6d35b1 | 3 |
| 5541a022ed0f79b2cffd3efd129d8e4e7dd07be8 | 5 |

BOTTOM-LAYER BF SPECIFICATION INFORMATION #2 — 25

| HASH VALUE | PBA |
|---|---|
| ba86df8c6c01381c959edd6d35b1204d0f2fbe9d | 1 |
| 2ed0f79b2cffd3efd129d8e4e7dd07be85541a02 | 3 |

| LBA | MBF-ID | HASH VALUE |
|---|---|---|
| 0 | 0 | 204d0f2fbe9dba86df8c6c01381c959edd6d35b1 |
| 1 | 0 | 5541a022ed0f79b2cffd3efd129d8e4e7dd07be8 |
| LBA_X | 1 | 0c1625ee1831cb4e1b0794c2fa641f59222bbb2a |

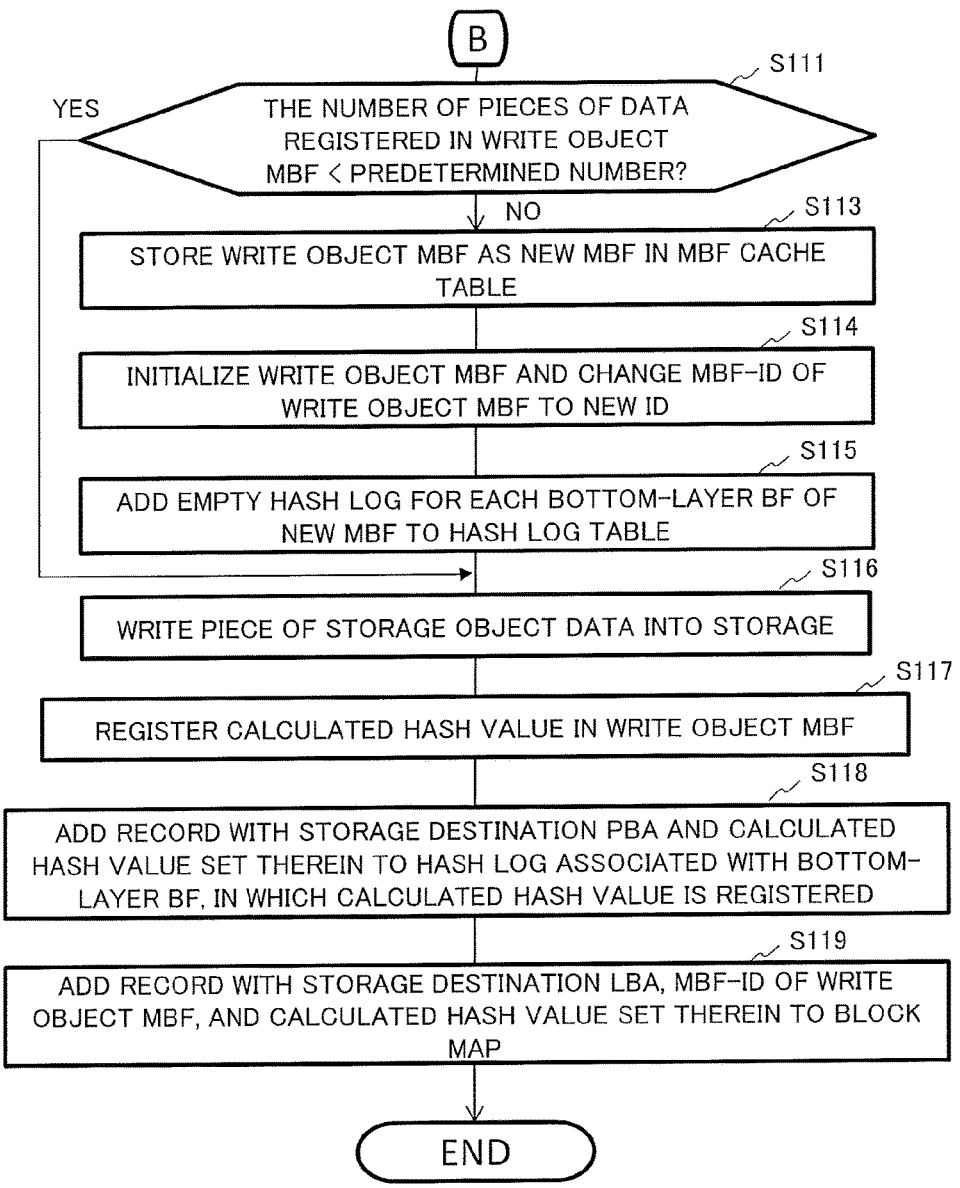

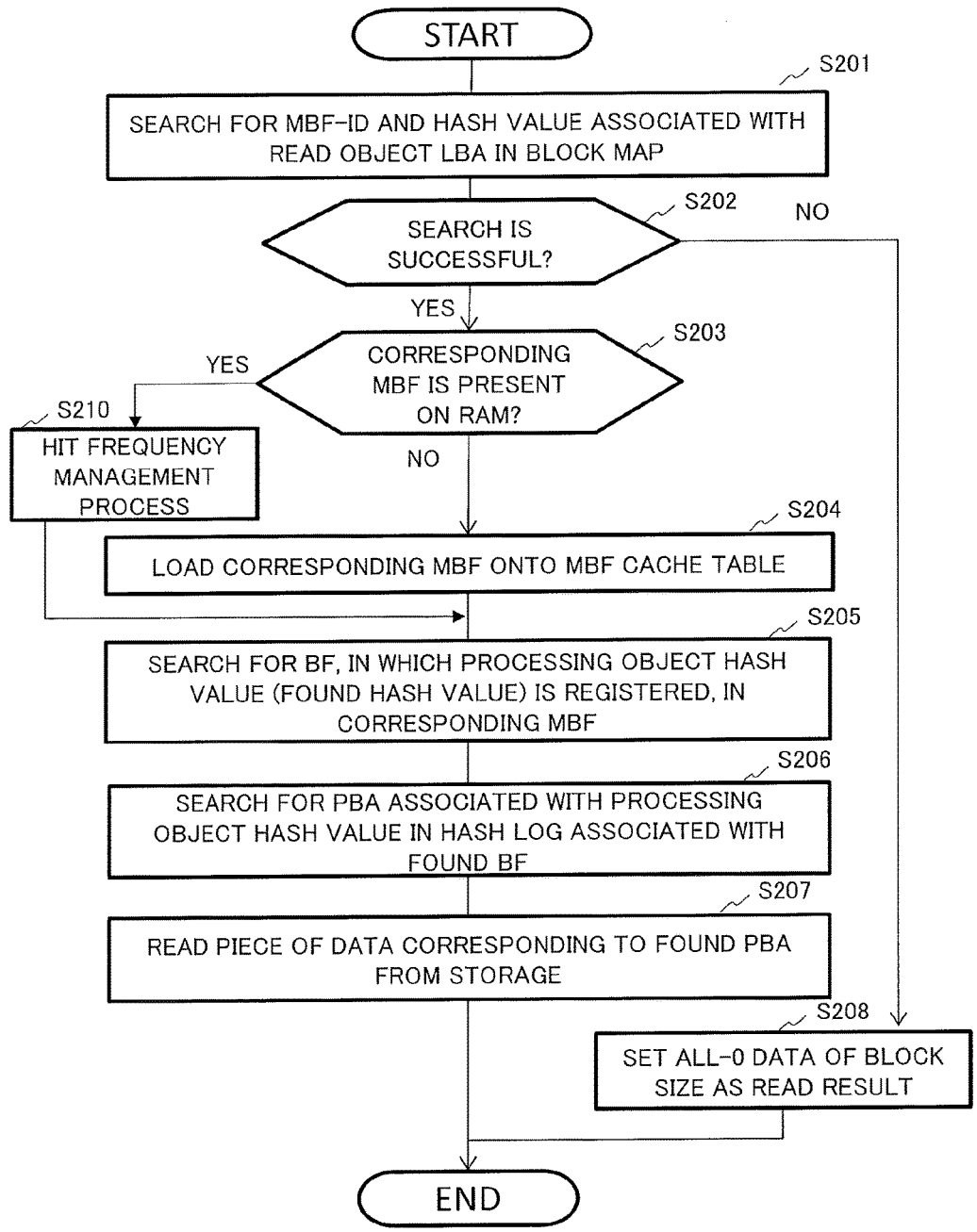

STORAGE CONTROL APPARATUS AND STORAGE CONTROL METHOD

CROSS-REFERENCE TO RELATED APPLICATION

This application is a continuation application of International Application PCT/JP2014/058353 filed on Mar. 25, 2014 and designated the U.S., and this application is based upon and claims the benefit of priority of the prior Japanese Patent Application No. 2013-074643, filed on Mar. 29, 2013, the entire contents of which are incorporated herein by reference.

FIELD

Disclosure relates to a storage control apparatus and a storage control method.

BACKGROUND

As a technique for achieving effective utilization of the storage capacity of a storage (storage device), a technique called, e.g., data redundancy elimination or redundancy exclusion that does not store redundant data in the storage is known. In an apparatus for data redundancy elimination, a Bloom filter or a multi-layer Bloom filter is generally used to determine whether pieces of data are redundant.

A multi-layer Bloom filter has a data structure with multiple layers of Bloom filters. The multi-layer Bloom filter has a function of searching for a storage region (address range) where data is stored. Although use of a multi-layer Bloom filter allows high-speed data redundancy elimination, the size of a multi-layer Bloom filter used for data management increases with an increase in storage size. For this reason, when a multi-layer Bloom filter is used, an apparatus is equipped with a relatively large capacity memory.

For further information, refer to Japanese Patent Laid-Open Publication No. 2011-186954, Japanese Patent Laid-Open Publication No. 2012-094220, International Publication No. WO 2010/100733, and T. Johnson and Dennis Shasha, "2Q: A Low Overhead High Performance Buffer Replacement Algorithm," Very Large Database Systems Conference 1994, September, 1994.

SUMMARY

According to an aspect of the embodiments, a storage control apparatus includes:
a control unit configured to
treat a storage as a device including a plurality of data storage regions which are divided into a plurality of data regions,
manage, every data storage region, an associative relation between an in-storage address and a hash value of each of pieces of data in the storage using a plurality of hash logs, and
manage an associative relation between a logical address and a hash value of each piece of data in the storage and a piece of identification information of a piece of data management information, in which a piece of data in the data region where pieces of data are stored is registered, and which is used to identify in which one of the data storage regions each piece of data in the data region is stored, the second associative relation being managed using a block map;
a first storage unit configured to store the plurality of hash logs and a piece of data management information for each data region; and
a second storage unit configured to allow data reading and writing at higher speed than the first storage unit.

the control unit performing a first process when a piece of data management information identified by a piece of identification information associated with a logical address of a piece of read object data in the block map is not stored in the second storage unit at a time of reading of the piece of read object data from the storage, the first process including
reading the piece of data management information stored in the first storage unit onto the second storage unit instead of any piece of data management information on the second storage unit;
identifying the hash log for the data storage region, in which the piece of read object data is stored, based on the loaded piece of data management information; and
reading the piece of read object data from the storage using a piece of information in the identified hash log,
the control unit performing a second process when a piece of data management information, in which a piece of storage object data is registered, is not stored in the second storage unit at a time of writing of the piece of storage object data, the second process including storing the piece of storage object data in the storage without determining whether the piece of storage object data is registered in a different piece of data management information, and
the control unit performing a third process when a predetermined condition is satisfied, the third process including:
selecting at least one of the pieces of data management information in accordance with priority based on how the pieces of data management information are used; and
eliminating, from the storage, a piece of redundant data in a different one of the data regions for a piece of data in the data region associated with each of the at least one piece of data management information selected.

The target and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a chart for explaining an MBF;

FIG. 4 is a chart for explaining a hash table;

FIG. 5 is a chart for explaining a block map;

FIG. 6B is a flowchart (Part II) of the storage process.

FIG. 7 is a flowchart of a read process;

DESCRIPTION OF EMBODIMENTS

A storage control apparatus according to one embodiment of the disclosed technique will be described below in detail with reference to the drawings.

Figure 1:
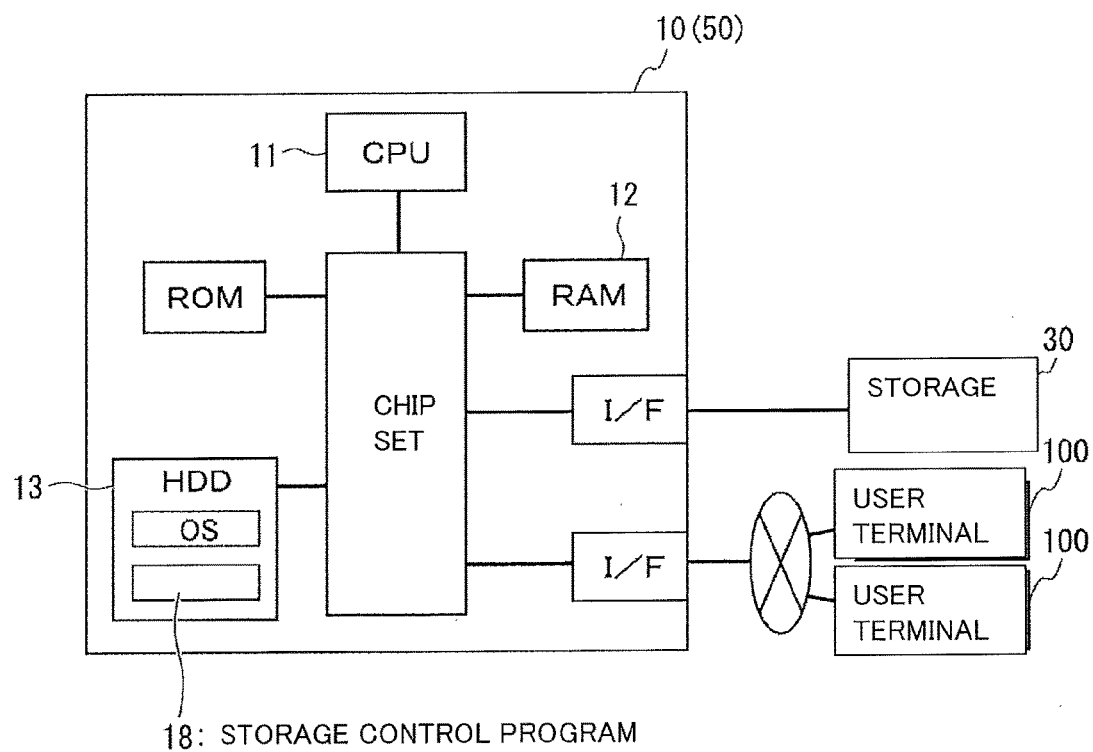
FIG. 1 is a diagram for explaining the configuration and usage pattern of a storage control apparatus according to an embodiment.

FIG. 1 illustrates the configuration and usage pattern of a storage control apparatus 10 according to the present embodiment.

As illustrated in FIG. 1, the storage control apparatus 10 is an apparatus in which an Operating System (OS), a storage control program 18, and the like are installed on an Hard Disk Drive (HDD) 13 of a computer 50. In other words, the computer 50, in which a Central Processing Unit (CPU) 11 loads the storage control program 18 (and the OS) onto a Random Access Memory (RAM) 12 and executes the storage control program 18 (and the OS) is the storage control apparatus 10.

The computer 50, on which the storage control program 18 is installed, is a common computer. A detailed description of the components will be omitted. The storage control apparatus 10 (computer 50) includes a flash Read Only Memory (ROM) (which is labeled "ROM" in FIG. 1) which stores firmware, such as an Initial Program Loader (IPL). The storage control apparatus 10 also includes a chip set (i.e., a single integrated circuit or a plurality of integrated circuits connected by a bus) which connects the components.

The storage control apparatus 10 further includes a communication interface ("I/F") for communication with a storage 30 and a communication interface ("I/F") for communication with at least one user terminal 100.

The storage 30 connected to the storage control apparatus 10 has a plurality of physical blocks for data storage (unit storage regions). The storage 30 is a device which allows specification of a physical block from or to which data is to be read or written by a physical block address (PBA).

An HDD, an Solid State Drive (SSD), or a combination of a plurality of HDDs and/or SSDs is connected as the storage 30 to the storage control apparatus 10.

The configuration and operation of the storage control apparatus 10 will be described in further detail below.

In the description below, a piece of data (e.g., a piece of storage object data) refers to a piece of information small enough to be stored in one physical block of the storage 30. A Logical Block Address (LBA) of a piece of data refers to an address which the user terminal 100 (a driver for the storage control apparatus 10 in the user terminal 100) uses as a data storage destination/read source address.

A piece of storage object data refers to a piece of data which the storage control apparatus 10 is to store in the storage 30. A verification hash value of a piece of storage object data refers to a hash value calculated from the piece of storage object data. A verification hash value is used for final determination on whether a piece of data identical in content to a piece of storage object data is present in the storage 30. A secure hash value calculated by MD5 (Message-Digest 5), SHA-1 (Secure Hash Algorithm 1), SHA-256, or the like is generally used as a verification hash value.

Figure 2:
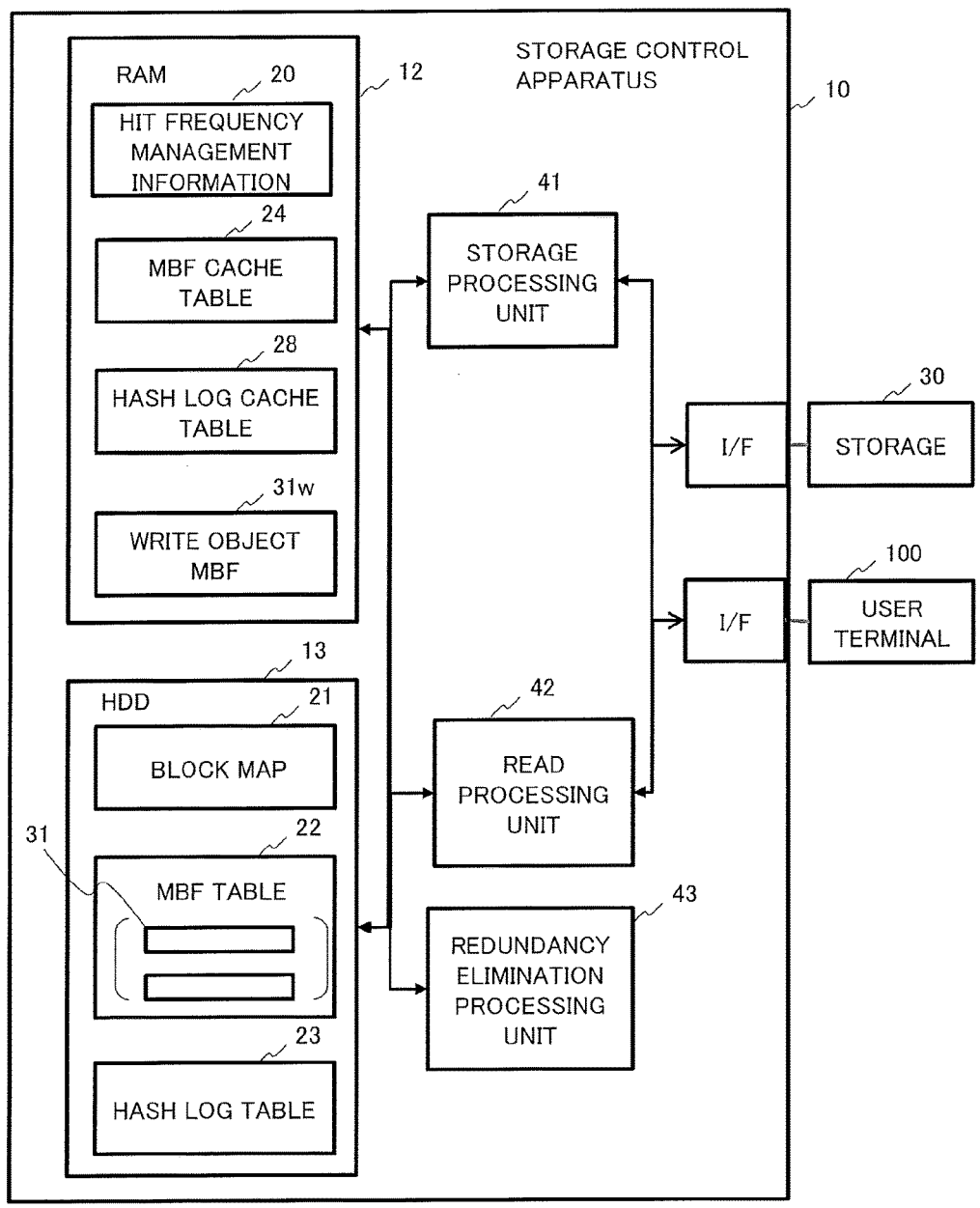
FIG. 2 is a block diagram of the storage control apparatus.

FIG. 2 illustrates a block diagram of the storage control apparatus 10. As illustrated in FIG. 2, the storage control apparatus 10 includes a storage processing unit 41, a read processing unit 42, and a redundancy elimination processing unit 43. The storage control apparatus 10 operates while holding hit frequency management information 20, a block map 21, an MBF cache table 24, a hash log cache table 28, a write object MBF 31w, an MBF table 22, and a hash log table 23 on the RAM 12 or in the HDD 13. When the storage control apparatus 10 is shut down, the hit frequency management information 20, the block map 21, the write object MBF 31w, and the like are saved in the HDD 13. When the storage control apparatus 10 is restarted, information identical to information on the RAM 12 before the shutdown is prepared on the basis of the information saved in the HDD 13.

The storage processing unit 41, the read processing unit 42, and the redundancy elimination processing unit 43 are units which are implemented by the CPU 11 (a control unit) executing the storage control program 18 (and the OS). The details of the processing units 41 to 43 will be described later. Each processing unit treats the storage 30 as a device, a whole storage region (or a major part of the storage region) of which is divided into a plurality of storage regions (hereinafter referred to as data storage regions) of an identical size. Each processing unit also treats the storage 30 as a device in which the plurality of data storage regions are divided into a plurality of groups (data regions).

The MBF table 22 in the HDD 13 is a table which can store a plurality of multi-layer Bloom filters (MBFs) 31 in association with MBF-IDs which are pieces of identification information of the respective MBFs 31. A specific procedure for updating the MBF table 22 will be described later. The MBF table 22 stores no MBF 31 at the start of operation of the storage control apparatus 10, and the MBFs 31 are to be added after the start of the operation of the storage control apparatus 10.

The MBF cache table 24 on the RAM 12 is a table which can store m (m is generally not less than 2) MBFs 31 in association with MBF-IDs of the respective MBFs 31. The MBF cache table 24 also stores information which allows selection of the MBF 31 to be swept out from the MBF cache table 24 by the LRU (Least Recently Used) algorithm.

Note that the MBF cache table 24 is also a table which stores no MBF 31 at the start of the operation of the storage control apparatus 10, like the MBF table 22.

The write object MBF 31w on the RAM 12 is the MBF 31, in which a verification hash value of a given piece of storage object data is registered when the piece of storage object data is written into the storage 30.

The relation among the write object MBF 31w, the MBF 31 on the MBF table 22, and the MBF 31 on the MBF cache table 24 will be described.

When a predetermined number of verification hash values are registered in the write object MBF 31w (a specific procedure for which will be described later), the MBF 31 (hereinafter referred to as the new MBF 31) identical in contents and MBF-ID to the write object MBF 31w is added to the MBF cache table 24. A process of initializing the write object MBF 31w and changing the MBF-ID of the write object MBF 31w to a new ID is further performed.

When m MBFs 31 are already stored in the MBF cache table 24 at the time of the addition to the MBF cache table 24 of the new MBF 31 (the write object MBF 31w), the least recently used (the oldest) MBF 31 is swept out from the MBF cache table 24. Note that sweeping-out of the MBF 31 from the MBF cache table 24 is also performed at the time of reading of the MBF 31 from the MBF table 22.

At the time of the sweeping-out of the MBF 31 from the MBF cache table 24, it is determined whether the MBF 31 to be swept out is stored in the MBF table 22. When the MBF 31 to be swept out from the MBF cache table 24 is not yet stored in the MBF table 22, the MBF 31 is added to the MBF table 22.

The configuration of the MBF 31 will be described together with a way to use the MBF 31.

The MBF 31 has such a data structure that use of the MBF 31 allows determination on whether a piece of data identical in content to a piece of storage object data is stored in the storage 30, like a common BF (Bloom Filter). Note that the MBF 31 is adapted such that a data storage region where a piece of desired data is written can be searched for.

More specifically, the M-layer (M≥2) MBF 31 includes $X_{i-1}$ BFs as BFs in an i-th (i=1 to M) layer. Generally, the size (the number of bits) of a BF in a j-th (j=2 to M) layer of the M-layer MBF 31 is $1/X_{j-1}$ of the size of a BF in a first layer. Note that X is an integer value not less than 2. In the description below, X also denotes a division number.

The BF in the first layer of the M-layer MBF 31 is associated with X BFs in a second layer. Each BF in the j-th (j=2 to M−1) layer of the M-layer (M≥3) MBF 31 is associated with X BFs in a (j+1)-th layer which are different from each other.

In short, the MBF 31 with the number M of layers of 3 and the division number X of 4 generally has a configuration schematically illustrated in FIG. 3. Note that, in FIG. 3, a lateral length of each BF represents the size (the number of bits) of the BF, and the hierarchical relation between BFs represents an associative relation between the BFs.

The associative relation described above is an associative relation between BFs. Data storage regions different from each other of the storage 30 are associated with $X_{i-1}$ BFs in an M-th layer (hereinafter also referred to as bottom-layer BFs) of the M-layer (M≥2) MBF 31.

When a piece of storage object data is written into a data storage region associated with a given bottom-layer BF, the MBF 31 is used in a way that a verification hash value of the piece of storage object data is registered in the bottom-layer BF and BFs which are directly or indirectly associated with the bottom-layer BF. Note that a BF directly associated with the given bottom-layer BF refers to a BF in a layer one ordinal rank higher which is associated with the bottom-layer BF. A BF indirectly associated with the given bottom-layer BF refers to a BF in a layer two or more ordinal ranks higher which is associated with the bottom-layer BF via several BFs.

Thus, when the MBF 31 used is one illustrated in FIG. 3, it is possible to search for a data storage region where a piece of data identical in content to a given piece of data (hereinafter referred to as a piece of processing object data) by, for example, the procedure below.

(1) Calculate a verification hash value of the piece of processing object data.

(2) Check whether the calculated verification hash value (hereinafter referred to as a calculated hash value) is registered in BF1-1.

(3a) Determine that the piece of processing object data is not stored in 16 "data storage regions under management of the MBF 31 in FIG. 3" (hereinafter referred to as check object regions) and end the process, when the calculated hash value is not registered in BF1-1.

(3b) Identify (search for) a BF in which the calculated hash value is registered among BF2-1 to BF2-4 in a second layer associated with BF1-1 when the calculated hash value is registered in BF1-1.

(4a) Determine that the piece of processing object data is not stored in the check object regions and end the process, when the identification of a BF in the second layer, in which the calculated hash value is registered, is unsuccessful. Note that the reason why a case may occur where a calculated hash value is registered in BF1-1 in the first layer but is not registered in any of the BFs in the second layer is because a BF is subject to erroneous determinations (false positives).

(4b) Identify a bottom-layer BF in which the calculated hash value is registered among four bottom-layer BFs (e.g., BF3-1 to BF3-4) associated with the identified BF when the identification of a BF in the second layer, in which the calculated hash value is registered, is successful.

(5a) Identify a BF in the second layer, in which the calculated hash value is registered, among unchecked BFs and then return to (4) ((4a) or (4b)), when the identification of a bottom-layer BF in which the calculated hash value is registered is unsuccessful.

(5b) Set a data storage region where a piece of data identical in content to the piece of processing object data is stored as a search result and end the process, when the identification of a bottom-layer BF in which the calculated hash value is registered is successful.

Note that, as described above, a BF may be subject to erroneous determinations (false positives). Thus, no piece of data identical in content to the piece of processing object data may be stored in a data storage region found by the above-described procedure.

Referring back to FIG. 2, the description will be continued.

The hash log table 23 in the HDD 13 is basically a table for storing, for each of pieces of data actually stored in the storage 30, a combination of a PBA of a physical block where the piece of data is stored and a verification hash value of the piece of data. Note that the hash log table 23 stores combinations, each composed of a PBA of a physical block where a piece of data is stored and a verification hash value of the piece of data, by data storage region.

More specifically, as schematically illustrated in FIG. 4, the hash log table 23 is configured to store a hash log 25 having a hash value field and a PBA field by piece of bottom-layer BF specification information.

A piece of bottom-layer BF specification information is a combination of, for example, an MBF-ID of the given MBF 31 and a piece of identification information (hereinafter referred to as a BF-ID) in the MBF 31 of the given bottom-layer BF of the MBF 31. It suffices that the piece of bottom-layer BF specification information is a piece of information by which one bottom-layer BF stored as an element of any MBF 31 in the storage control apparatus 10 can be identified and from which an MBF-ID of an MBF including the bottom-layer BF can be known.

As already described above, each bottom-layer BF of the MBF 31 is associated with a specific (unique) data storage region of the storage 30. Therefore, each hash log 25 in the hash log table 23 is associated with a specific data storage region of the storage 30 via a piece of bottom-layer BF specification information associated with the hash log 25.

The hash log 25 associated with a given data storage region in the hash log table 23 is a table where a record on a piece of data written in the data storage region is stored. A record on a piece of data written in a given data region here refers to a record in which a verification hash value of the piece of data and a PBA of a physical block where the piece of data is written are set.

As has been described above, letting L be the number of bottom-layer BFs of each MBF 31, the hash log table 23 stores L sets of hash logs and pieces of bottom-layer BF specification information (hereinafter referred to as pieces of MBF-specific hash log information) for each MBF 31. Note that the hash log table 23 at the start of the operation of the storage control apparatus 10 holds no piece of MBF-specific hash log information, like the MBF table. The hash log table 23 is a table which is updated by the same procedure as the update procedure for the MBF table.

That is, the hash log cache table 28 that can store (m+1) pieces of MBF-specific hash log information is prepared on the RAM 12 (FIG. 2) of the storage control apparatus 10. At the start of the operation of the storage control apparatus 10, the hash log cache table 28 is in a state storing "a piece of MBF-specific hash log information with each hash log 25 storing no record" for the write object MBF 31*w* (hereinafter referred to as an initial value for a piece of MBF-specific hash log information) alone.

When the given MBF 31 is swept out from the MBF cache table 24 due to addition of the new MBF 31 (the MBF 31 identical in contents and MBF-ID to the write object MBF 31*w*), a piece of MBF-specific hash log information for the MBF 31 is swept out from the hash log cache table 28. When the given MBF 31 is also swept out from the MBF cache table 24 due to reading of the MBF 31 from the MBF table, a piece of MBF-specific hash log information for the MBF 31 is also swept out from the hash log cache table 28.

When a piece of MBF-specific hash log information to be swept out from the hash log cache table 28 is not yet stored in the hash log table 23, the piece of MBF-specific hash log information is added to the hash log table 23.

At the time of addition of the new MBF 31 to the MBF table 22, an initial value for a piece of MBF-specific hash log information for the new MBF 31 is added to a portion where no piece of MBF-specific hash log information has been stored or a portion, from which a previously stored piece of MBF-specific hash log information has been swept out, of the hash log cache table 28.

FIG. 5 illustrates the configuration of the block map 21 on the RAM 12 and/or the HDD 13. As illustrated in FIG. 5, the block map 21 has an LBA field, an MBF-ID field, and a hash value field.

The block map 21 is a table where each time a piece of storage object data is stored in the storage 30, a record with an LBA and a verification hash value of the piece of storage object data set in the LBA field and the hash value field is added. When a record on a given piece of storage object data is added to the block map 21, an MBF-ID of the MBF 31, in which a verification hash value of the piece of storage object data is registered, is set in the MBF-ID field of the record.

For convenience of illustration, the details of the hit frequency management information 20 (FIG. 2) will be described later.

Operations of the storage processing unit 41, the read processing unit 42, and the redundancy elimination processing unit 43 will be described below.

The operation of the storage processing unit 41 will be described first. The storage processing unit 41 is usually waiting for a write request to the storage 30 to be received by the communication interface ("I/F") for the user terminal 100 (performing monitoring).

When a write request for a given piece of information is transmitted from the user terminal 100, the storage processing unit 41 determines whether the piece of information (hereinafter referred to as a piece of storage object information) is a piece of information of a size small enough to be stored in one physical block of the storage 30. When the piece of storage object information is a piece of information of a size small enough to be stored in one physical block, the storage processing unit 41 treats the piece of storage object information itself as a piece of storage object data and executes a storage process with the procedure illustrated in FIGS. 6A and 6B.

On the other hand, when the piece of storage object information is not a piece of information of a size small enough to be stored in one physical block, the storage processing unit 41 divides the piece of storage object information into a plurality of pieces of data of a size small enough to be stored in a physical block. The storage processing unit 41 executes, for each of the pieces of data obtained through the division, the storage process (FIGS. 6A and 6B) using the piece of data as a piece of storage object data.

Figure 6A:
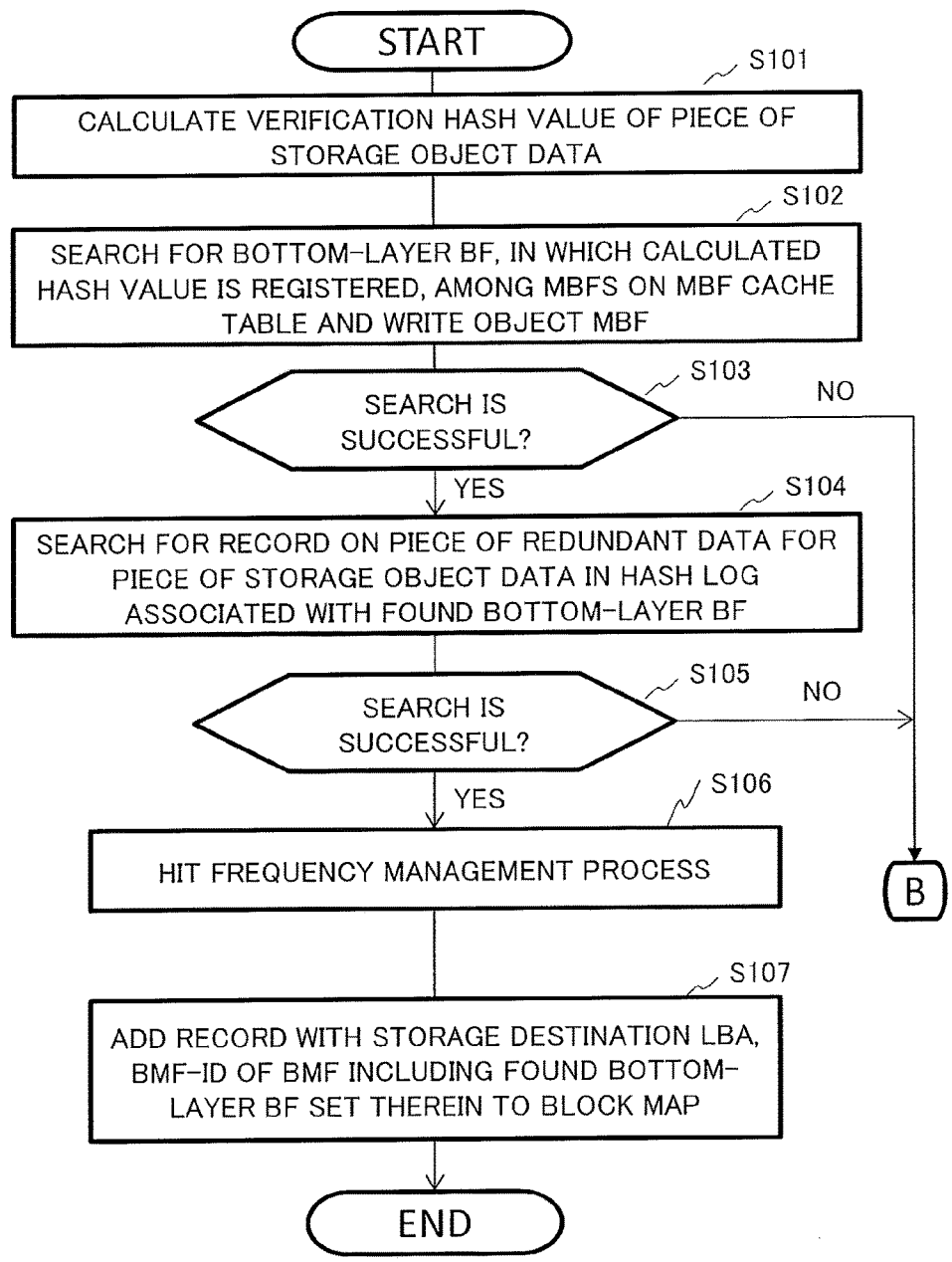
FIG. 6A is a flowchart (Part I) of a storage process.

As illustrated in FIG. 6A, the storage processing unit 41 after the start of the storage process first calculates a verification hash value of a piece of storage object data (step S101).

The storage processing unit 41 searches for a bottom-layer BF, in which the calculated verification hash value (hereinafter referred to as a calculated hash value) is registered, among the MBFs 31 on the MBF cache table 24 and the write object MBF 31*w* (step S102). That is, the storage processing unit 41 performs the above-described processes in (2) to (5a) for each of the MBFs 31 on the MBF cache table 24 and the write object MBF 31*w*.

As already described, at the start of the operation of the storage control apparatus 10, no MBF 31 is stored in the MBF cache table 24. Thus, the search in step S102 is performed for the write object MBF 31*w* alone for some time after the start of the operation of the storage control apparatus 10.

When the search for a bottom-layer BF, in which the calculated hash value is registered, is unsuccessful (NO in step S103), the storage processing unit 41 determines whether the number of pieces of data registered in the write object MBF 31*w* is less than a predetermined number (step S111 in FIG. 6B).

When the number of pieces of data registered in the write object MBF 31*w* is less than the predetermined number (YES in step S111), the storage processing unit 41 writes the piece of storage object data in the storage 30 (step S116). At the time of the process in step S116, the storage processing unit 41 selects a PBA (hereinafter referred to as a storage destination PBA) of a physical block in which the piece of storage object data is to be written from among PBAs of empty physical blocks in data storage regions associated with bottom-layer BFs of the write object MBF 31*w*. Note that an empty physical block refers to a physical block in which no piece of data is stored. As a storage destination PBA, an address subsequent to an address which is a previous storage destination PBA is generally selected.

The storage processing unit 41 after the writing of the piece of storage object data into the storage 30 registers the calculated hash value in the write object MBF 31*w* (step S117). That is, the storage processing unit 41 registers the calculated hash value in a bottom-layer BF of the write object MBF 31*w* that is associated with a data storage region where the piece of storage object data is stored and in BFs of the write object MBF 31*w* which are directly or indirectly associated with the bottom-layer BF. In step S117, the storage processing unit 41 adds "1" to the number of pieces of data registered in the write object MBF 31*w* on the RAM 12 managed by the storage processing unit 41.

The storage processing unit 41 after the process in step S117 adds a record with the storage destination PBA and the calculated hash value set therein to the hash log 25 on the hash log cache table 28 that is associated with the bottom-layer BF, in which the calculated hash value is registered (step S118). More specifically, the storage processing unit 41 adds the record with the storage destination PBA and the calculated hash value set therein to the hash log 25 on the hash log cache table 28 that is associated with a piece of bottom-layer BF specification information indicating the bottom-layer BF, in which the calculated hash value is registered.

The storage processing unit 41 adds a record with a storage destination LBA, the MBF-ID of the write object MBF 31w, and the calculated hash value set therein to the block map 21 (step S119) and then ends the storage process. Note that a storage destination LBA refers to an LBA included in a received write request or an LBA calculated from the LBA and a position of a piece of storage object data in a piece of storage object information (a piece of information, writing of which is requested by the write request).

When the process in step S117 is executed times, the number of which is equal to "the predetermined number," after the start of the operation of the storage control apparatus 10, the number of pieces of data registered in the write object MBF 31w becomes "the predetermined number." When the search in step S102 (or S104) is unsuccessful when the number of pieces of data registered in the write object MBF 31w is "the predetermined number," the storage processing unit 41 determines that the number of pieces of data registered in the write object MBF 31w is not less than the predetermined number (NO in step S111).

Thus, the storage processing unit 41 stores (adds) the MBF 31 identical in contents and MBF-ID to the write object MBF 31w in (to) the MBF cache table 24 (step S113). In other words, the storage processing unit 41 stores (adds) a copy (hereinafter referred to as the new MBF 31) of the write object MBF 31w, the number of pieces of data registered of which is the predetermined number, in (to) the MBF cache table 24 (step S113).

Note that, in step S113, a process of adding the MBF 31 on the MBF cache table 24 to the MBF table 22 or the like may be performed. More specifically, at the time of the process in step S113, the storage processing unit 41 first determines whether m MBFs 31 are stored on the MBF cache table.

When m MBFs 31 are not stored on the MBF cache table, the storage processing unit 41 adds the new MBF 31 to the MBF cache table and then ends the process in step S113.

On the other hand, when m MBFs 31 are stored on the MBF cache table, the storage processing unit 41 identifies the least recently used MBF 31 on the MBF cache table as "the MBF 31 of interest." The storage processing unit 41 then determines whether an MBF-ID of the MBF 31 of interest is stored as a registered MBF-ID in the RAM 12.

When the MBF-ID of the MBF 31 of interest is not stored as a registered MBF-ID in the RAM 12, the storage processing unit 41 performs the three processes below:
(a) a process of adding the MBF 31 of interest to the MBF table together with its MBF-ID;
(b) a process of adding a piece of MBF-specific hash log information on the hash log cache table 28 for the MBF 31 of interest to the hash log table; and
(c) a process of storing the MBF-ID of the MBF 31 added to the MBF table as a registered MBF-ID in the RAM 12.

The storage processing unit 41 after these processes stores the new MBF 31 in a portion where the MBF 31 of interest had been stored on the MBF cache table and ends the process in step S113.

On the other hand, when the MBF-ID of the MBF 31 of interest is stored as a registered MBF-ID in the RAM 12, the storage processing unit 41 stores the new MBF 31 in a portion where the MBF 31 of interest had been stored on the MBF cache table without performing the three processes. The storage processing unit 41 ends the process in step S113.

The storage processing unit 41 after the process in step S113 performs a process of initializing the write object MBF and changing the MBF-ID of the write object MBF to a new ID (step S114). The new ID refers to an MBF-ID different from any other existing MBF-ID. The new ID is generated by, for example, adding "1" to the MBF-ID of the write object MBF.

The storage processing unit 41 then stores an initial value for a piece of MBF-specific hash log information for the new MBF 31 in the hash log cache table (step S115). In step S115, the initial value for a piece of MBF-specific hash log information for the new MBF 31 is stored in a portion where the piece of MBF-specific hash log information for the MBF 31 of interest had been stored of the hash log cache table.

The storage processing unit 41 ends the storage process after executing the processes in steps S116 to S119 already described.

The details of the processes in the remaining steps of the storage process will be described below.

When the search for a bottom-layer BF, in which the calculated hash value is registered, is successful (YES in step S103 of FIG. 6A), the storage processing unit 41 searches for a record on a piece of redundant data for the piece of storage object data in a hash log on the hash log cache table 28 that is associated with the bottom-layer BF (step S104). A record on a piece of redundant data for a piece of storage object data here refers to a record, a value in the hash value field of which coincides with the calculated hash value.

When the search for a record on a piece of redundant data for the piece of storage object data is unsuccessful (NO in step S105), the storage processing unit 41 executes the processes in step S111 (FIG. 6B) and subsequent steps and ends the storage process, as in the case where the search in step S102 is unsuccessful.

On the other hand, when the search for a record on a piece of redundant data for the piece of storage object data is successful (YES in step S105), the storage processing unit 41 performs a hit frequency management process (step S106 to be described later in detail).

The storage processing unit 41 after the hit frequency management process adds a record with a storage destination LBA, an MBF-ID of the MBF 31 including the found bottom-layer BF, and the calculated hash value set therein to the block map 21 (step S107). The storage processing unit 41 then ends the storage process.

The operation of the read processing unit 42 (FIG. 2) will be described.

The read processing unit 42 is a unit that performs reading of data from the storage 30.

FIG. 7 illustrates a flowchart of a read process to be performed by the read processing unit 42 to read a given piece of data from the storage 30. Note that, in the flowchart and the description below, a piece of read object data refers to a piece of data which the read processing unit 42 is to read from the storage 30. A read object LBA refers to an LBA of a piece of read object data. When a read request to the storage 30 is transmitted from the user terminal 100, the read processing unit 42 prepares a requested piece of information by executing the read process several times and sends the piece of information to the user terminal 100 in reply.

As illustrated in FIG. 7, the read processing unit 42 after the start of the read process first searches for an MBF-ID and a hash value associated with a read object LBA in the block map 21 (step S201).

When the search for the MBF-ID and the like associated with the read object LBA is unsuccessful (NO in step S202), the read processing unit 42 sets ALL-0 data of a block size as a result of reading a piece of data with the read object LBA (step S208). Note that all-0 data of the block size is a piece of data, all bits of which are "0," and which has a size equal to the block size.

The read processing unit 42 after the process in step S208 ends the read process.

In short, storage destination LBAs of all of pieces of data previously stored in the storage 30 are stored in the block map 21 (see FIGS. 6A and 6B). Thus, when the search for the MBF-ID and the like associated with the read object LBA is unsuccessful (NO in step S202), the piece of read object data (a piece of data identified by the read object LBA) is believed to be absent. For this reason, the all-0 data of the block size is set as the result of reading the piece of data with the read object LBA.

On the other hand, when the search for the MBF-ID and the like associated with the read object LBA is successful (YES in step S202), the read processing unit 42 determines whether the corresponding MBF 31 is present on the RAM 12 (step S203). The corresponding MBF 31 here refers to the MBF 31, to which the MBF-ID found in the process in step S201 is assigned. Note that the process in step S203 is not a process of determining whether the corresponding MBF 31 is present among all the MBFs 31 on the MBF cache table but a process of determining whether the corresponding MBF 31 is present among all the MBFs 31 on the MBF cache table and the write object MBF 31w.

When the corresponding MBF 31 is not present on the RAM 12 (NO in step S203), the read processing unit 42 performs the processes below in step S204.

The read processing unit 42 first identifies the least recently used MBF 31 on the MBF cache table as the MBF 31 of interest. The storage processing unit 41 then determines whether an MBF-ID of the MBF 31 of interest is stored as a registered MBF-ID on the RAM 12.

When the MBF-ID of the MBF 31 of interest is not stored as a registered MBF-ID on the RAM 12, the storage processing unit 41 performs the three processes below that are the same as described above:
(a) a process of adding the MBF 31 of interest to the MBF table together with its MBF-ID;
(b) a process of adding a piece of MBF-specific hash log information on the hash log cache table 28 for the MBF 31 of interest to the hash log table; and
(c) a process of storing the MBF-ID of the MBF 31 added to the MBF table as a registered MBF-ID in the RAM 12.

The storage processing unit 41 after these processes reads the corresponding MBF 31 from the MBF table 22 and stores the MBF 31 as a substitute for the MBF 31 of interest in the MBF cache table. The storage processing unit 41 also reads a piece of MBF-specific hash log information for the corresponding MBF 31 from the hash log table 23 and stores the piece of MBF-specific hash log information as a substitute for the piece of MBF-specific hash log information for the MBF 31 of interest in the MBF cache table.

The storage processing unit 41 ends the process in step S204.

In short, the read processing unit 42 performs a process almost identical in details to the processes to be performed by the storage processing unit 41 in steps S113 and S115 (FIG. 6B) of the storage process, in step S204. Note that determination on the number of MBFs 31 on the MBF cache table is not performed in step S204 because step S204 is a step which is not executed unless the number of MBFs 31 on the MBF cache table is not 3.

The read processing unit 42 after the process in step S204 starts the processes in step S205 and subsequent steps.

When the corresponding MBF 31 is present on the RAM 12 (step S203), the read processing unit 42 starts the processes in step S205 and subsequent steps after the hit frequency management process (to be described later in detail) in step S210.

In step S205, the read processing unit 42 searches for a bottom-layer BF, in which the verification hash value (hereinafter referred to as a processing object hash value) found by the process in step S201 is registered, in the corresponding MBF 31. The read processing unit 42 then searches for a PBA associated with the processing object hash value in a hash log on the hash log cache table 28 which is associated with the found bottom-layer BF (step S206). After that, the read processing unit 42 reads a piece of data in a physical block indicated by the found PBA as the piece of read object data from the storage 30 (step S207). The read processing unit 42 ends the read process.

The redundancy elimination processing unit 43, the hit frequency management process, and the hit frequency management information 20 will be described below.

The redundancy elimination processing unit 43 is a unit that performs redundancy elimination on pieces of data already stored in the storage 30.

That is, as described above, the storage control apparatus 10 determines the presence or absence of a piece of redundant data for a piece of storage object data from the MBFs 31 and pieces of MBF-specific hash log information on the RAM 12 alone, at the time of storage of the piece of storage object data in the storage 30 (see FIGS. 6A and 6B). Thus, use of the storage control apparatus 10 allows storage of a piece of storage object data in the storage 30 at higher speed than use of "an apparatus which also loads the MBFs 31 in the HDD 13 onto the RAM 12 and determines the presence or absence of a piece of redundant data" or "an apparatus with the hash log table 23 present on the RAM 12." The storage control apparatus 10 is an apparatus, for which the RAM 12 with storage capacity, smaller than in "an apparatus with the hash log table 23 and the MBF table 22 present on the RAM 12," suffices.

Note that since the storage control apparatus 10 is an apparatus which determines the presence or absence of a piece of redundant data from the MBFs 31 and pieces of MBF-specific hash log information on the RAM 12 alone, the storage control apparatus 10 is also an apparatus which may write a piece of storage object data, a piece of redundant data for which is actually present, to the storage 30.

Pieces of identical data present in the storage 30 waste the storage capacity of the storage 30. For this reason, it is desirable to perform redundancy elimination on pieces of data already stored in the storage 30. However, the speed of response to a read request may be low, depending on the way of redundancy elimination.

More specifically, assume, for example, a case where verification hash values of pieces A to D of data are stored in MBF-specific hash log information #1 at the time of writing of a file α, and verification hash values of pieces of data identical in content to the pieces A to D of data are stored in MBF-specific hash log information #2 to MBF-specific hash log information #5, respectively. Assume that m=2, for convenience of illustration.

In this case, data redundancy can be eliminated by various methods. Note that when data redundancy is eliminated by updating MBF-specific hash log information #1 and the block map 21, the file α previously read by referring to MBF-specific hash log information #1 alone becomes unable to be read without referring to MBF-specific hash log information #2 to MBF-specific hash log information #5.

The storage control apparatus 10 is an apparatus which, when an MBF and a piece of MBF-specific hash log information needed for data reading are absent on the RAM 12 (see FIG. 7), loads the pieces of information from the HDD. Thus, when data redundancy is eliminated by updating MBF-specific hash log information #1 and the block map 21, a piece of information needs to be loaded at least twice from the HDD at the time of reading of the file α though the maximum number of times a piece of information is loaded from the HDD has been 1 before the elimination.

As described above, the speed of response to a read request may be low, depending on the way of redundancy elimination.

Processes thought of to allow redundancy elimination that prevents the speed of response to a read request from becoming low are the hit frequency management process and a redundancy elimination process to be described below.

The overview of the hit frequency management information 20 that is a piece of information to be referred to and updated by the hit frequency management process will be described first.

The hit frequency management information 20 includes a piece of first queue information to a piece of (N+1)-th queue information. Here, a piece of i-th (i=1 to N+1) queue information refers to a piece of information on an i-th queue which is a "FIFO (First In, First Out) queue which can hold a plurality of MBF-IDs and of which an MBF-ID at an arbitrary position can be taken out." The piece of i-th queue information includes a plurality of MBF-IDs held in the i-th queue and the positional relation among the MBF-IDs in the i-th queue.

Figure 8A:
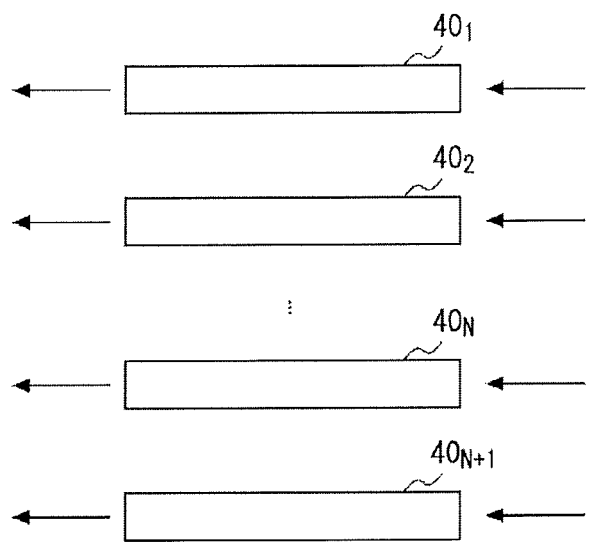
FIG. 8A is a chart for explaining hit frequency management information.

The details of the hit frequency management process will be described. Note that the hit frequency management process to be actually performed by the CPU 11 operating as the storage processing unit 41 or the read processing unit 42 is a process of changing the content of several pieces of queue information such that each changed piece of queue information indicates a queue different in combination of held MBF-IDs and the order of the MBF-IDs from the original queue. Note that the details of the hit frequency management process will be described below for convenience of illustration on the assumption that first to (N+1)-th queues $40_1$ to $40_{N+1}$ which are hardware queues with the above-described specifications are present, as schematically illustrated in FIG. 8A.

The hit frequency management process is a process of updating the hit frequency management information 20 using an MBF-ID of the MBF 31 found and identified before execution of the process. Note that the MBF-ID (hereinafter referred to as a processing object ID) of the found and identified MBF 31 before execution of the hit frequency management process is an MBF-ID of the MBF 31 found by the process in step S102 in the storage process (FIG. 6A). The processing object ID is an MBF-ID of the corresponding MBF 31 found by the process in step S201 in the read process (FIG. 7).

As can be seen from the procedures for the storage process and the read process already described, the hit frequency management process is a process to be executed when the MBF 31 on the RAM 12 can be directly used, i.e., when a cache hit occurs. Thus, the processing object ID can be regarded as an MBF-ID of the MBF 31 found in a cache.

The CPU 11 after the start of the hit frequency management process first treats the processing object ID as a piece of input data to the first queue $40_1$ and determines whether a piece of data identical to the piece of input data (the processing object ID) is present in the first queue $40_1$.

Figure 8B:
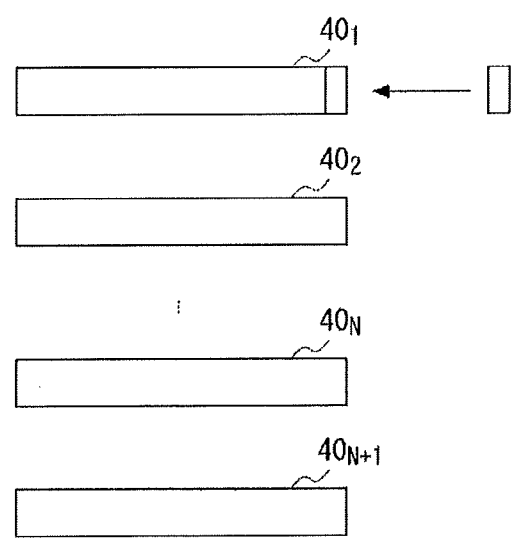
FIG. 8B is a chart for explaining the hit frequency management information.

When there is no piece of data identical to the piece of input data in the first queue $40_1$, the CPU 11 registers (adds) the piece of input data in (to) the first queue $40_1$, as schematically illustrated in FIG. 8B, and ends the hit frequency management process.

On the other hand, when there is a piece of data identical to the piece of input data in the first queue $40_1$, the CPU 11 takes the piece of data out of the first queue $40_1$. As schematically illustrated in FIG. 8C, the CPU 11 treats the taken piece of data (the piece of data identical to the processing object ID) as a piece of input data to the second queue $40_2$ and performs processing, identical in details to the processing for the first queue $40_1$, on the second queue $40_2$.

Figure 8C:
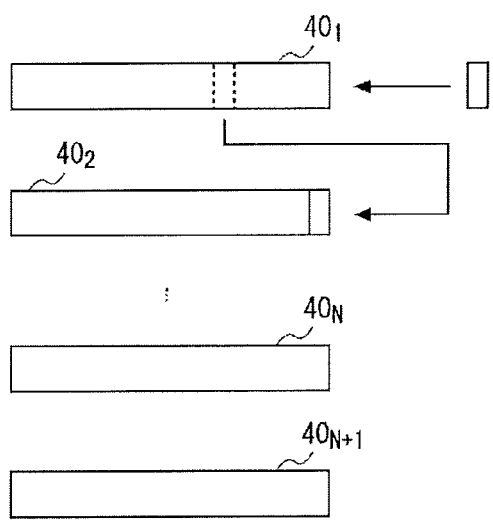
FIG. 8C is a chart for explaining the hit frequency management information.

That is, when there is no piece of data identical to the piece of input data in the second queue $40_2$, the CPU 11 registers (adds) the piece of input data in (to) the second queue $40_2$, as schematically illustrated in FIG. 8C, and ends the hit frequency management process. On the other hand, when there is a piece of data identical to the piece of input data in the second queue $40_2$, the CPU 11 takes the piece of data out of the second queue $40_2$. The CPU 11 then treats the taken piece of data as a piece of input data to the third queue (not illustrated) and performs processing identical in details to the processing for the first queue $40_1$ (and the second queue $40_2$) on the third queue.

Processing to be performed by the CPU 11 on the N-th queue $40_N$ when a piece of data identical to a piece of input data can be taken out of the (N−1)-th queue (not illustrated) is processing identical in details to the processing for the first queue $40_1$. Note that processing to be performed by the CPU 11 on the (N+1)-th queue $40_{N+1}$ when a piece of data identical to a piece of input data can be taken out of the N-th queue $40_N$ is slightly different from the processing for the first queue $40_1$.

More specifically, when a piece of data identical to the piece of input data can be taken out of the N-th queue $40_N$, the CPU 11 first determines whether a piece of data identical to the piece of processing object ID is present in the (N+1)-th queue $40_{N+1}$. When there is no piece of data identical to the processing object ID in the (N+1)-th queue $40_{N+1}$, the CPU 11 registers the processing object ID in the (N+1)-th queue $40_{N+1}$ and then ends the hit frequency management process. On the other hand, when the processing object ID is present in the (N+1)-th queue $40_{N+1}$, the CPU 11 takes the processing object ID out of the (N+1)-th queue $40_{N+1}$ and registers the processing object ID in the (N+1)-th queue $40_{N+1}$ again. In other words, the CPU 11 changes the position of the processing object ID in the (N+1)-th queue $40_{N+1}$ to the front, an element at which takes a longest time to discard. The CPU 11 ends the hit frequency management process.

The operation of the redundancy elimination processing unit 43 will be described.

The redundancy elimination processing unit 43 performs a process of knowing the status of the (N+1)-th queue $40_{N+1}$ by referring to the hit frequency management information 20 according to a preset schedule (e.g., every Z1 hours, every day, or at Z2 o'clock).

Figure 9:
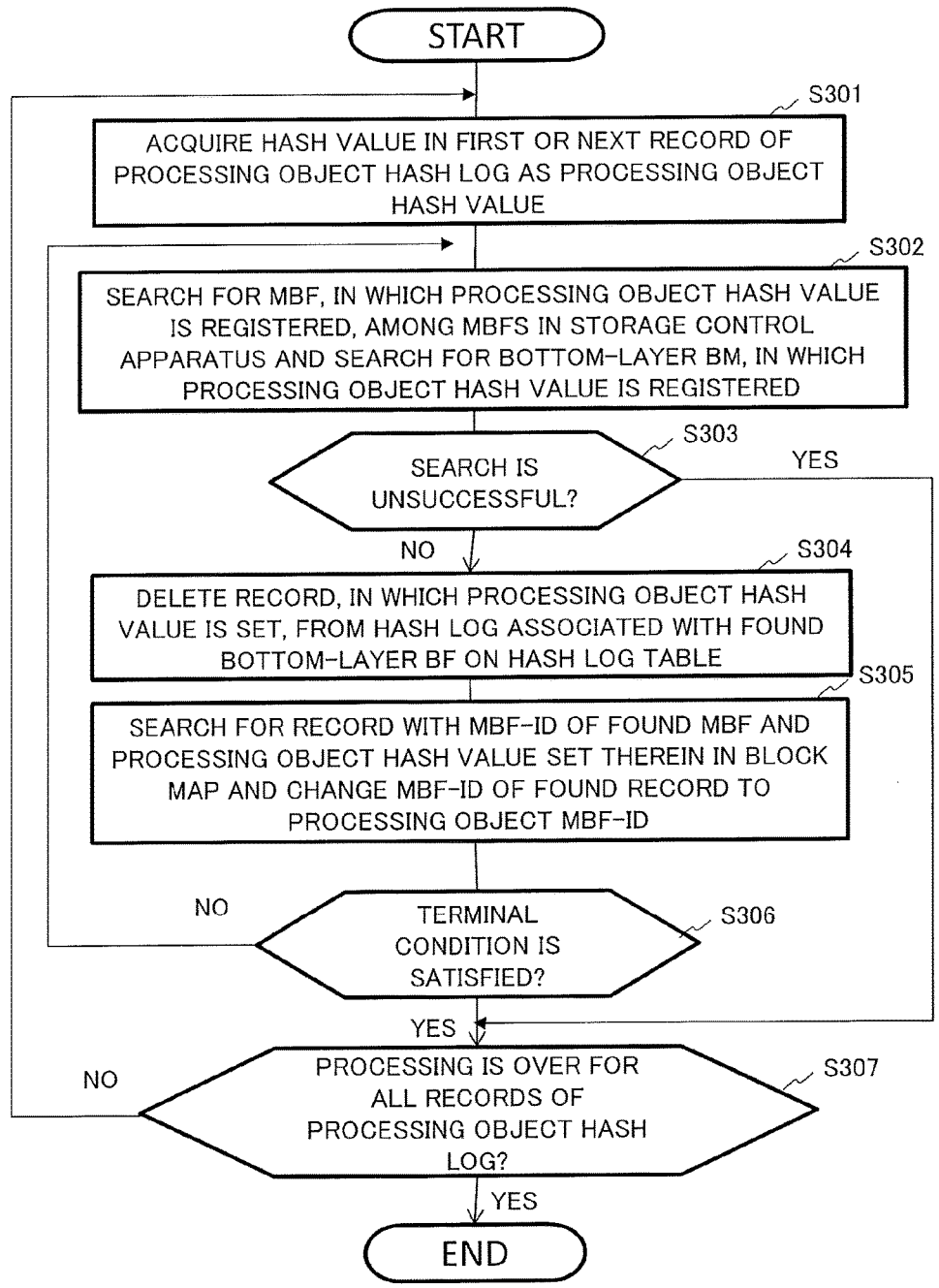
FIG. 9 is a flowchart of a redundancy elimination process.

When one or more MBF-IDs are present in the (N+1)-th queue $40_{N+1}$, the redundancy elimination processing unit 43 takes all of MBF-IDs from the (N+1)-th queue $40_{N+1}$. The redundancy elimination processing unit 43 treats each of the taken MBF-IDs as a processing object MBF-ID, treats each of the hash logs 25 for the MBF-ID as a processing object hash log, and performs the redundancy elimination process with the procedure illustrated in FIG. 9. Note that each hash log 25 for a given MBF-ID is the hash log 25 associated with one of bottom-layer BFs of the MBF 31 identified by the MBF-ID.

That is, the redundancy elimination processing unit 43 after the start of the redundancy elimination process on a given processing object hash log first acquires a hash value of a first record of the processing object hash log (i.e., a verification hash value of a given piece of data) as a processing object hash value (step S301).

The redundancy elimination processing unit 43 searches for the MBF 31, in which the processing object hash value is registered, among MBFs in the storage control apparatus 10 and searches for a bottom-layer BF, in which the processing object hash value is registered, in the found MBF 31 (step S302). The process in step S302 is a process of searching for the MBF 31, in which the processing object hash value is registered, among MBFs, MBF-IDs of which coincide with none of the MBF-IDs taken out of the (N+1)-th queue $40_{N+1}$, and for which the presence or absence of registration of the processing object hash value has not been checked in the process in step S302 last time or at an earlier time.

When the search for the MBF 31, in which the processing object hash value is registered, is successful (NO in step S303), the redundancy elimination processing unit 43 deletes a record with the processing object hash value set therein from a hash log associated with the found bottom-layer BF (step S304). When hash logs associated with the found bottom-layer BF are present in the hash log table and in the hash log cache table, the process in step S304 is performed on the hash logs in the two tables.

In step S305, the redundancy elimination processing unit 43 first searches for a record with an MBF-ID of the found MBF and the processing object hash value set therein in the block map. The redundancy elimination processing unit 43 changes the MBF-ID of the found record to the processing object MBF-ID (step S305) and performs determination in step S306. Note that when no record with the processing object hash value set therein is found by the process in step S304, the redundancy elimination processing unit 43 performs the determination in step S306 without performing the process in step S305.

In step S306, the redundancy elimination processing unit 43 determines whether a termination condition for loop processing from step S302 to step S306 is satisfied. The termination condition for the loop processing from step S302 to step S306 is, for example, that the loop processing is repeated until the search in step S302 is unsuccessful (the processes in steps S302 to S305 are performed once).

When the termination condition for the loop processing from step S302 to step S306 is not satisfied, the redundancy elimination processing unit 43 restarts the processes in step S302 and subsequent steps.

When the search in step S302 is unsuccessful (YES in step S303), the redundancy elimination processing unit 43 determines whether processing is over for all records of the processing object hash log (step S307). When the termination condition for the loop processing from step S302 to step S306 is satisfied (YES in step S306), the redundancy elimination processing unit 43 also determines whether processing is over for all the records of the processing object hash log (step S307).

When processing is not over for all the records of the processing object hash log (NO in step S307), the redundancy elimination processing unit 43 returns to step S301 to acquire a hash value in a next record of the processing object hash log as the processing object hash value.

When processing is over for all the records of the processing object hash log, the redundancy elimination processing unit 43 ends the redundancy elimination process.

In short, MBF-ID_β is input to the (N+1)-th queue $40_{N+1}$ in the hit frequency management process (see FIG. 8C) when MBF-ID_β has been taken out of the (N−1)-th queue before MBF-ID_β is discarded from the N-th queue $40_N$ that is a FIFO queue. Since the (N−1)-th queue is also a FIFO queue, MBF-ID_β is taken out of the (N−1)-th queue when MBF-ID_β has been taken out of the (N−2)-th queue before MBF-ID_β is discarded from the (N−1)-th queue.

Since the other queues are FIFO queues, MBF-ID_β is not input to a next queue unless MBF-ID_β has been taken out of a previous queue before MBF-ID_β is discarded from each queue. Thus, an MBF-ID registered in the (N+1)-th queue is an MB-FID of an MBF, recent hit frequency of which is particularly high.

The redundancy elimination process to be performed by the redundancy elimination processing unit 43 performs redundancy elimination while maintaining the contents of each hash log associated with such an MBF. Maintenance of the contents of each hash log associated with an MBF, recent hit frequency of which is particularly high, generally allows the average number of times information is loaded from the HDD needed at the time of file reading to be prevented from increasing. The redundancy elimination process and the redundancy elimination through the hit frequency management process are thus performed so as not to lower the speed of response to a read request.

Modifications

Various modifications can be made to the storage control apparatus 10. For example, the storage control apparatus 10 can be modified into an apparatus in which the block map 21 is stored in the HDD 13. The storage control apparatus 10 can also be modified into an apparatus without the hash log cache table 28 (an apparatus in which the hash log table 23 is constantly accessed).

A piece of information which has the same function and is not classified as an MBF can be adopted instead of an MBF. That is, a piece of information, in which a piece of data in a data region where pieces of data are stored is registered, and which can be used to identify in which one of data storage regions each piece of data in the data region is stored, can also be adopted instead of an MBF. A process of counting the number of times each MBF is used or the frequency with which each MBF is used may be adopted instead of the hit frequency management process. The hit frequency management process may also be modified into a process of actually controlling a hardware queue.

The storage control apparatus 10 can be modified into a dedicated apparatus or an apparatus integral with the storage 30. The storage control apparatus 10 can also be modified into an apparatus which is used while being connected to the storage 30 that is to be accessed by a logical block address (the storage 30, in which a logical block address is converted into a physical block address). Note that the modification can be implemented by using an LBA of the storage 30 alone instead of a PBA.

The storage control program 18 can be distributed in the form of being recorded on a movable recording medium, such as a flexible disc or a CD-ROM (Compact Disc Read Only Memory).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control apparatus, comprising:
   a control unit configured to
      treat a storage device as a device including a plurality of data storage regions which are divided into a plurality of data regions,
      manage, every data storage region, a first associative relation between an in-storage address and a hash value of each of pieces of data in the storage device using a plurality of hash logs, and
      manage a second associative relation between a logical address and the hash value of each piece of data in the storage device and a piece of identification information of a piece of first data management information, in which a piece of data in the data region where pieces of data are stored is registered, and which is used to identify which data storage regions the data region storing the piece of data belongs to, the second associative relation being managed using a block map;
   a first storage unit configured to store the plurality of hash logs and the piece of first data management information for each data region; and
   a second storage unit configured to allow data reading and writing at higher speed than the first storage unit,
   the control unit performing a first process when the piece of first data management information identified by the piece of identification information associated with the logical address of a piece of read object data in the block map is not stored in the second storage unit at a time of reading of the piece of read object data from the storage device, the first process including:
      reading the piece of first data management information stored in the first storage unit onto the second storage unit instead of any piece of first data management information on the second storage unit;
      identifying the hash log for the data storage region, in which the piece of read object data is stored, based on the read piece of first data management information; and
      reading the piece of read object data from the storage device using a piece of information in the identified hash log,
   the control unit performing a second process when the piece of first data management information, in which a piece of storage object data is registered, is not stored in the second storage unit at a time of writing of the piece of storage object data, the second process including storing the piece of storage object data in the storage device, and
   the control unit performing a third process when a predetermined condition is satisfied, the third process including:
      selecting at least one of the pieces of first data management information in accordance with priority based on how the pieces of first data management information are used;
      determining a hash log for the at least one of the pieces of first data management information;
      selecting the hash value from the determined hash log;
      searching the piece of first data management information in which the selected hash value is registered;
      eliminating a piece of redundant data in a data region indicated by the logical address associated, by the block map, with the selected hash value and the identification information of the searched piece of first data management information.

2. The storage control apparatus according to claim 1, wherein the piece of first data management information comprises a multi-layer Bloom filter which includes, for each data storage region, a Bloom filter, in which a piece of data stored in the data storage region is registered.

3. The storage control apparatus according to claim 1, wherein the second storage unit is configured to store a piece of second data management information for writing and a second hash log for writing, and
   wherein the control unit is configured to store the piece of storage object data in the storage device, register the piece of storage object data in the piece of second data management information for writing, and update the second hash log for writing and the block map when the piece of first data management information, in which the piece of storage object data is registered, is not stored in the second storage unit at the time of writing of the piece of storage object data.

4. A storage control method for storing data in a storage device through redundancy elimination, the method comprising:
   treating, using a processor, the storage device as a device including a plurality of data storage regions which are divided into a plurality of data regions;
   managing, using the processor, every data storage region, an associative relation between an in-storage address and a hash value of each of pieces of data in the storage device using a plurality of hash logs on a first storage unit;
   managing, using the processor, an associative relation between a logical address and the hash value of each piece of data in the storage device and a piece of identification information of a piece of data management information, in which a piece of data in the data region where pieces of data are stored is registered, and which is used to identify which data storage regions the data region storing the piece of data belongs to using a block map on the first storage unit or a second storage unit that allows data reading and writing at higher speed than the first storage unit;
   performing, using the processor, a first process when the piece of data management information identified by the piece of identification information associated with the logical address of a piece of read object data in the block map is not stored in the second storage unit at a time of reading of the piece of read object data from the storage device, the first process including reading the piece of data management information stored in the first storage unit onto the second storage unit instead of any piece of data management information on the second storage unit, identifying the hash log for the data storage region, in which the piece of read object data is stored, based on the read piece of data management information, and loading the piece of read object data from the storage using a piece of information in the identified hash log;

performing, using the processor, a second process when the piece of data management information, in which a piece of storage object data is registered, is not stored in the second storage unit at a time of writing of the piece of storage object data, the second process including storing the piece of storage object data in the storage device; and performing, using the processor, a third process when a predetermined condition is satisfied, the third process including selecting at least one of the pieces of data management information in accordance with priority based on how the pieces of data management information are used;

determining a hash log for the at least one of the pieces of data management information;

selecting the hash value from the determined hash log;

searching the piece of data management information in which the selected hash value is registered; and eliminating a piece of redundant data in a data region indicated by the logical address associated, by the block map, with the selected hash value and the identification information of the searched piece of data management information.

5. A computer-readable recording medium having stored therein a storage control program for causing a computer to operate as a storage control apparatus which executes a process for performing redundancy elimination and storing data in a storage device, the process comprising:

treating the storage device as a device including a plurality of data storage regions which are divided into a plurality of data regions;

managing, every data storage region, a first associative relation between an in-storage address and a hash value of each of pieces of data in the storage device using a plurality of hash logs on a first storage unit;

managing a second associative relation between a logical address and the hash value of each piece of data in the storage device and a piece of identification information of a piece of data management information, in which a piece of data in the data region where pieces of data are stored is registered, and which is used to identify which data storage regions the data region storing the piece of data belongs to using a block map on the first storage unit or a second storage unit that allows data reading and writing at higher speed than the first storage unit;

performing a first process when the piece of data management information identified by the piece of identification information associated with the logical address of a piece of read object data in the block map is not stored in the second storage unit at a time of reading of the piece of read object data from the storage device, the first process including reading the piece of data management information stored in the first storage unit onto the second storage unit instead of any piece of data management information on the second storage unit, identifying the hash log for the data storage region, in which the piece of read object data is stored, based on the read piece of data management information, and loading the piece of read object data from the storage device using a piece of information in the identified hash log;

performing a second process when the piece of data management information, in which a piece of storage object data is registered, is not stored in the second storage unit at a time of writing of the piece of storage object data, the second process including storing the piece of storage object data in the storage device; and performing a third process when a predetermined condition is satisfied, the third process including selecting at least one of the pieces of data management information in accordance with priority based on how the pieces of data management information are used, determining a hash log for the at least one of the pieces of data management information;

selecting the hash value from the determined hash log;

searching the piece of data management information in which the selected hash value is registered; and eliminating a piece of redundant data in a data region indicated by the logical address associated, by the block map, with the selected hash value and the identification information of the searched piece of data management information.

6. A storage control apparatus, comprising:

a control unit configured to treat a storage device as a device including a plurality of data storage regions which are divided into a plurality of data regions, manage, every data storage region, a first associative relation between an in-storage address and a hash value of each of pieces of data in the storage device using a plurality of hash logs, and manage a second associative relation between a logical address and the hash value of each piece of data in the storage device and a piece of identification information of a hash log, in which pieces of data are stored, using a block map;

a first storage unit configured to store the plurality of hash logs; and a second storage unit configured to allow data reading and writing at higher speed than the first storage unit, the control unit performing a first process when a hash log identified by the piece of identification information associated with the logical address of a piece of read object data in the block map is not stored in the second storage unit at a time of reading of the piece of read object data from the storage device, the first process including reading the hash log stored in the first storage unit onto the second storage unit instead of any hash log on the second storage unit, and loading the piece of read object data from the storage device using a piece of information in the read hash log, the control unit performing a second process when a hash log which holds the hash value identical to the hash value of a piece of storage object data is not stored in the second storage unit at a time of writing of the piece of storage object data, the second process including storing the piece of storage object data in the storage device, and the control unit performing a third process when a predetermined condition is satisfied, the third process including selecting at least one of the hash logs in accordance with priority based on how the hash logs are used, selecting the hash value from the at least one of the hash log;

eliminating a piece of redundant data in a data region indicated by the logical address associated, by the block map, with the selected hash value and the identification information of the at least one of the hash logs.

* * * * *